(12) United States Patent
Rollet

(10) Patent No.: US 7,924,710 B2
(45) Date of Patent: Apr. 12, 2011

(54) METHOD FOR TRANSMITTING DATA INCLUDING AN ERROR CONTROL MECHANISM DESIGNED FOR UNRELIABLE NETWORKS AND ERROR RESILIENCE APPLICATIONS

(75) Inventor: Romain Rollet, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 862 days.

(21) Appl. No.: 10/932,123

(22) Filed: Sep. 2, 2004

(65) Prior Publication Data

US 2005/0083847 A1   Apr. 21, 2005

(30) Foreign Application Priority Data

Sep. 5, 2003   (EP) .................................... 03292195

(51) Int. Cl.
*G06F 11/00* (2006.01)
(52) U.S. Cl. ......... 370/230; 370/389; 370/428; 370/474
(58) Field of Classification Search .................. 370/231, 370/232, 233, 234, 236
See application file for complete search history.

(56) References Cited

U.S. PATENT DOCUMENTS

| 5,867,480 | A | * | 2/1999 | Thomas et al. | ............... 370/230 |
| 2002/0069388 | A1 | * | 6/2002 | Niu et al. | ...................... 714/748 |
| 2003/0018794 | A1 | * | 1/2003 | Zhang et al. | .................. 709/231 |
| 2004/0163025 | A1 | * | 8/2004 | Lakaniemi | ..................... 714/758 |

FOREIGN PATENT DOCUMENTS

| EP | 1 054 526 A1 | 11/2000 |
| WO | WO 00/79763 A1 | 12/2000 |
| WO | WO 02/30098 A2 | 4/2002 |

* cited by examiner

*Primary Examiner* — Jayanti K Patel
*Assistant Examiner* — Bo Hui A Zhu
(74) *Attorney, Agent, or Firm* — Oblon, Spivak, McClelland, Maier & Neustadt, L.L.P.

(57) ABSTRACT

A method for transmitting a payload encapsulated in a packet from a transmitter to a receiver by using an Automatic Request process, in which: the receiver checks each packet received from the transmitter to detect some potential corrupted received packets the receiver acknowledges the correct or the corrupted reception of each received packet by emitting one or many acknowledgment messages to the transmitter; the transmitter resends the packets that were indicated as corrupted in the received acknowledgment messages. For at least some packets, the transmitter implements an EC-PartARQ error control mechanism including the steps of: defining a sensitive part and a non-sensitive part in the transmitted packet; checking only the sensitive parts in the packets to detect any potential corrupted received packet, a packet being considered as corrupted if the sensitive part has not been correctly received.

7 Claims, 4 Drawing Sheets

METHOD FOR TRANSMITTING DATA INCLUDING AN ERROR CONTROL MECHANISM DESIGNED FOR UNRELIABLE NETWORKS AND ERROR RESILIENCE APPLICATIONS

The present invention concerns a method for transmitting a payload encapsulated in a packet from a transmitter to a receiver by using an Automatic Request process, in which:

the receiver checks each packet received from the transmitter to detect any potential corrupted received packets;

the receiver acknowledges the correct or the corrupted reception of each received packet by emitting one or many acknowledgment messages to the transmitter;

the transmitter sends again the packets that were indicated as corrupted in the acknowledgment messages sent by the receiver.

With the growing development of multimedia applications, numerous researches have been conducted in the encoding of exchanged data in order to improve their transmission over data networks. In particular, some applications such as video decoding software are able to support error in their received data streams. Some error resilience and concealment mechanisms allow detecting errors, and are able to deal with them. Depending on application performance, the final user may note some small defaults that are not too serious to bother him. For example, in a MPEG/2 video transmission, these defaults are small visual artefacts that may occur during a short time interval. In audio transmission such as GSM mobile phone, defaults mean voice quality degradations or short interruptions. This class of applications has been developed in order to be transmitted over unreliable packet networks such as satellite broadcasting, cellular networks, wireless LAN . . . In the same time, these applications are also able to support delay. Generally, for each one, a maximum delay value is given, which allows to set-up the network according to the application requirement.

In order to deal with the high error rate in wireless networks, error control mechanisms have been employed at link layer stage in many ways. Two basic approaches are Forward Error Correction (FEC) and Automatic Repeat Request (ARQ).

With ARQ, each packet is protected by a CRC (Cyclical Redundancy Check) in order to detect error bits inside the header and the payload of each packet. The receiver requests the bad received packets from the transmitter that are retransmitted later. Many ARQ schemes have been proposed in the literature and have been implemented in standards. Among them, most popular are "Stop and Go" (implemented for instance in the IEEE 802.11 wireless LAN standard), Go Back N and selective Repeat.ARQ (implemented in the HiperLAN/2 standard). This process introduces delay transmission since packets are sent to the upper layers only when they have been correctly received. For this reason, some discard mechanisms have been introduced to avoid transmission of too old packets when congestion occurs. From criteria such as maximum allowed delay defined by the transported application, the transmitter discards a set of packets in order to empty its queues and catch up the delay. For the application, it results in packet losses.

The FEC method adds parity data to the original data in the transmitter. In the receiver, this introduced redundancy is used to recover from errors. A redundancy is included within the original message, FEC adds an extra mount of data that depends on the targeted robustness. The more the added parity data will be long, the more the FEC will be able to correct a large number of errors. Therefore, FEC results in a more important overhead but, unlike ARQ, it does not add non-deterministic delay. However, the FEC method cannot guaranty an error-free data flow.

Hybrid ARQ (HARQ) schemes proposes to combine FEC and ARQ in order to minimise the number of retransmissions and the transmission delay. In type-III HARQ (or Chase combining), multiple copies of a same retransmitted packet can be recombined in the receiver. In type-II HARQ (Incremental redundancy), additional redundant information are incrementally retransmitted if the decoding fails on the first attempt. By reducing the number of retransmissions, such mechanisms allow decreasing the transmission delay and optimise the usage of network resources.

However, all these approaches are not really adapted for the error resilience applications presented previously. Indeed, FEC alone does not guaranty that all errors in the data stream will be corrected. It cannot guaranty a given Bit Error Rate (BER) whatever the redundancy code is. It means that the perceived quality of the application depends only on the performance of error resilience mechanisms in the application. In some cases, FEC mechanism can lead to numerous artefacts although the network conditions (network load) are not so bad. On the other hand, ARQ is able to provide to the application an error-free data stream, which leads to a very high quality delivered to the final user and avoids artefacts generated by the FEC approach. Nevertheless, this perfect service can be broken when congestion and packet discarding occur. In this case, the error resilience feature is not used since no data are provided to the application. It results a very unpleasant effect for the user.

The aim of the invention is to define link layer error control mechanism designed for unreliable network (wireless, Power Line Communications . . . ) and error resilience applications (video, audio . . . ) which enables good quality transmission even when a congestion of the transmission occurs.

Accordingly, the subject matter of the invention is a method according to claim 1.

As long as the network conditions allow it, it guaranties an error-free data stream. When congestion occurs, it guaranties an error-free service on the sensitive part of data stream (i.e. the part of data where a bit corruption involves important data losses because the errors are unrecoverable at any level). On the remaining part of data, some possible bit errors may occur but the mechanism guaranties rio data losses, which allows the application to use its error resilience and concealment features.

According to particular embodiments, the method comprises the features of one or more sub-claims.

The invention will be better understood on reading the description which follows, given merely by way of example and while referring to the drawings in which.

Figure 1:
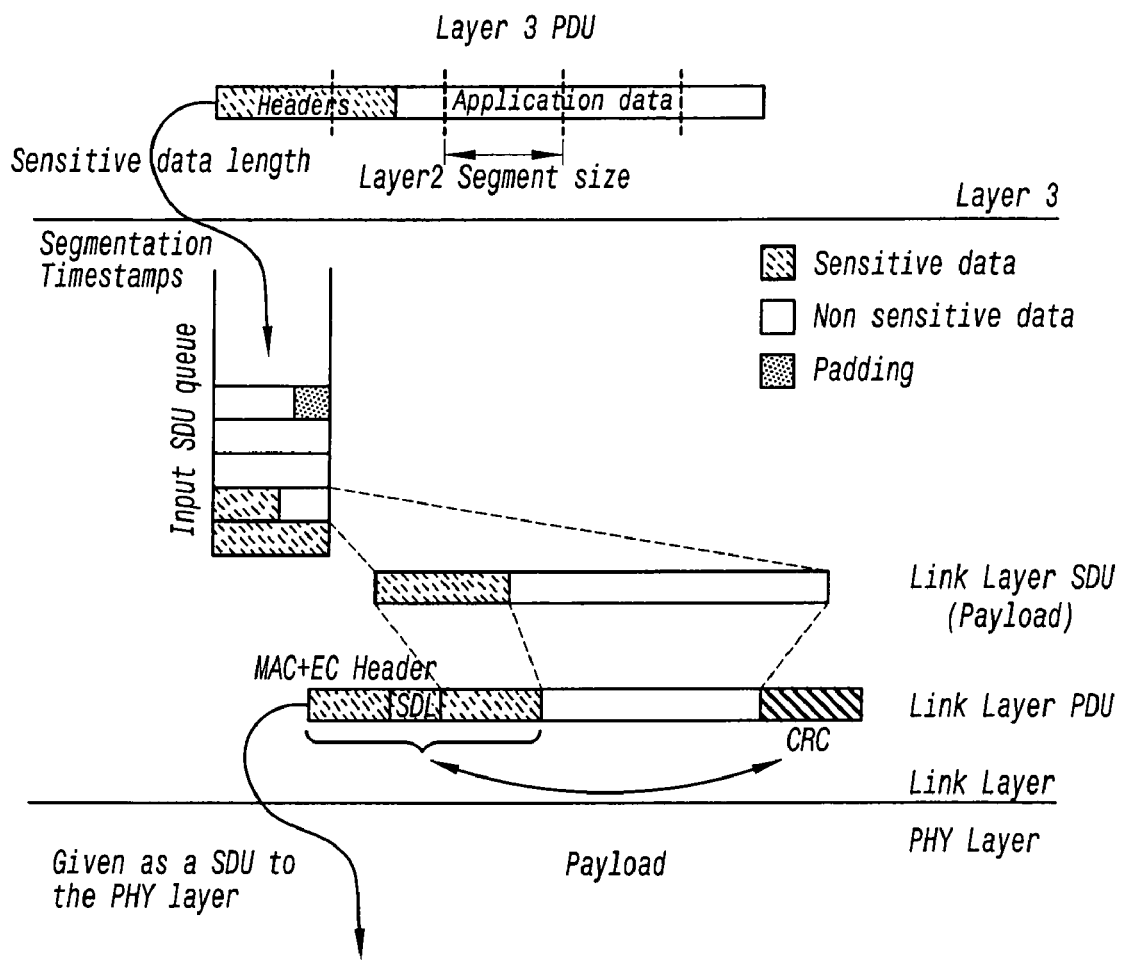
FIG. 1 is a schematical view of the data path in the transmitter from layer 3 to layer 1, according to standard OSI model

According to the standard OSI model and as shown on FIG. 1, the link layer (i.e. layer 2) is responsible of sharing the service provided by the PHY interface between many users. Furthermore, it can implement some Error Control mechanisms to correct possible errors generated by the PHY layer.

As known per se, layer 3 which is a network layer in the OSI model provides Protocol Data Units (L3-PDU) which have to be transmitted to the receiver.

According to the invention, layer 3 determines, in each L3-PDU, the data which are sensitive and the data which are not sensitive for the application performance. Each time layer 3 wants to send a L3-PDU to the link layer, it provides data information defining the set of data that are error sensitive in addition to the L3-PDU. Assuming that the error sensitive data are at the beginning of the L3-PDU, these information are advantageously the PDU length, and the number of bytes of the PDU data that are error sensitive. This last parameter is called SDL-3.

Practically, the error sensitive bytes are located at the beginning of the L3-PDU. Indeed, application data are often transported over intermediate protocol before reaching the link layer. These protocols add some information in headers located at the beginning of the packets. Protocols usually do not support errors in their header, which implies that headers must be processed differently by the link layer compared to the application data stream.

As known per se, the link layer timestamps, segments optionally the L3-PDU and produces so-called Service Data Unit (LL-SDU) stored in an input LL-SDU queue. Then, they are encapsulated in a Link Layer PDU (LLPDU) that groups MAC and EC information relative to each packet and the LL-SDU which is called the payload. A generic LL-PDU format for the link layer is shown in FIG. 1.

The MAC+EC header contains information such as a frame type control field, a stream or connection ID (or a source and destination addresses for a connectionless link layer) to identify the recipient and/or a packet sequence number.

According to the invention, two modes for error control are provided by the link layer for each LL-SDU provided by the network layer 3 and the segmentation process, depending on the sensitivity of the data and the current implementation of the process.

These modes are called EC-ARQ mode and EC-PartARQ mode.

Both modes are based on ARQ mechanism. In the following example, a "stop and go" ARQ mechanism is implemented.

In EC-ARQ mode, packets are repeated by the transmitter when some errors have been detected by the receiver. In this mode, the receiver detects bit errors on the entire packet. It can be realised thanks to a CRC field that covers the entire packet.

In a EC-PartARQ mode, the LL-PDU is divided in two parts: a sensitive part that contains crucial or sensitive data and a non-sensitive or unprotected part containing data that can be processed by the associated application even if it contains some errors. The length of each part is variable and can optionally be zero. The sensitive part is located at the beginning of the LL-PDU and its length is called SDL-2. The sensitive part is protected with a CRC covering only this sensitive part.

EC-ARQ may be considered as a particular case of the EC-PartARQ mode: the non-sensitive part is empty and the sensitive part covers the whole packet. In EC-ARQ mode, SDL-2 is equal to the length of the LL-PDU.

Figure 2:
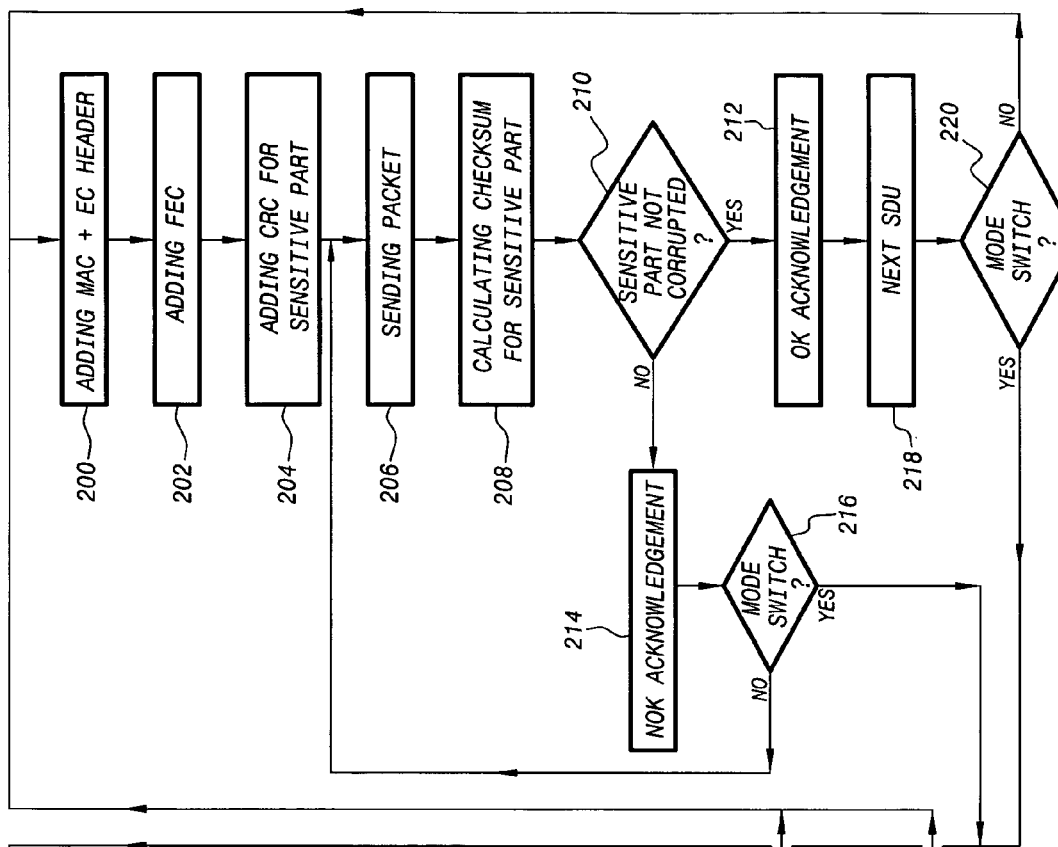
FIG. 2 is a flow chart of the process used for implementing the transmission.
Figure 2:
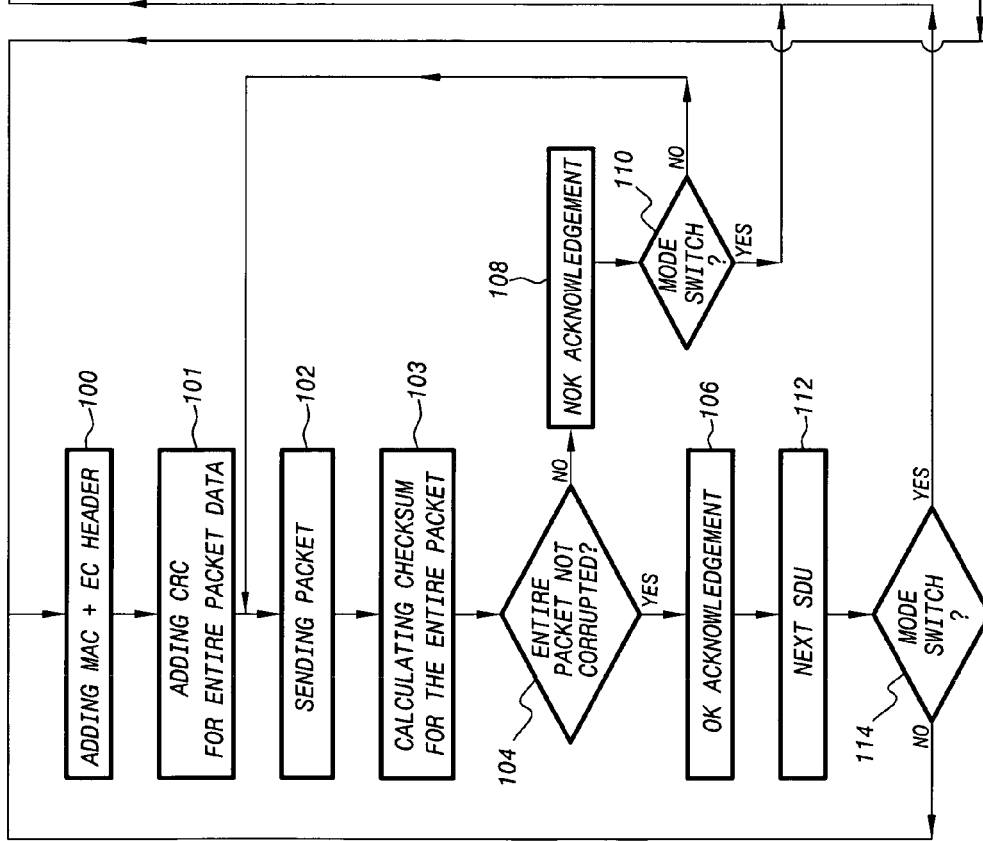

FIG. 2 shows a general view of the transmission process according to the invention.

For each LL-SDU, the transmitter uses one of the EC-ARQ mode and EC-PartARQ mode. The mode can be changed for each LL-PDU transmission.

We assume that EC-ARQ mode is the current transmission mode.

For a given LL-SDU, the link layer adds, at step 100, an header which contains MAC and EC information. Indeed, and as known per se, the link layer contains usually a Medium Access Control (MAC) and an Error Control (EC) sub-layers. MAC organises the access to the medium and adds information relative to addressing. As mentioned before, EC may implement schemes in order to face the medium errors. Advantageously, the MAC+EC header contains a specific field called Sensitive Data Length (SDL) containing an information defining the sensitive part. This field might encode advantageously the SDL-2 parameter, which is systematically equal to the length of the entire LL-PDU since the packet contains only sensitive data in ECARQ mode.

A CRC based on the entire content of the packet is calculated at step 101. Thus, the CRC (cyclical Redundancy Check) depends on the payload (SDU from layer 3) concatenated with the MAC+EC header.

At step 102, the LL-PDU is sent to the receiver and the emitter is waiting for an acknowledgement.

In EC-ARQ mode, the receiver calculates the checksum of the entire packet, which means payload and header parts of the LL-PDU and compare it with the CRC, at step 103.

If the checksum is equal to the CRC (step 104), the LL-PDU is considered as being correctly received and a "correct (OK) acknowledgement" is returned to the emitter, at step 106.

If the checksum does not correspond to the CRC (step 104), the LLLL-PDU is considered as corrupted and a "not correct (NOK) acknowledgement" is returned to the emitter, at step 108.

At step 110, a test is performed to decide whether the next LL-PDU transmission has to be made with the same mode or with the other mode. The criteria applied will be disclosed in the followings.

If the transmission mode has not to be switched, steps 102 and 103 are repeated.

When the transmitted LL-PDU is considered as correct, the following LL-SDU is considered in the LL-SDU queue, at step 112.

It is then checked, at step 114, if the same mode can still be used or if the mode has to be changed. The same criteria as at step 110 are applied.

When the EC-PartARQ mode is implemented, the MAC+EC header is first added to the LL-SDU, at step 200.

Advantageously, the MAC+EC header contains the specific field called Sensitive Data Length (SDL) containing an information defining the sensitive part. This field might encode advantageously the SDL-2 parameter, that defines the number of bytes of sensitive data assuming that all the data of the sensitive part are located at the beginning of the LL-PDU.

Figure 3:
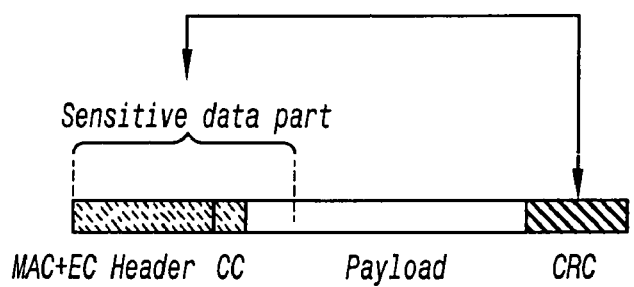
FIG. 3 is a view of a general frame format used in the implementation of the invention

As shown on FIG. 3, SDL-2 is equal to the length of the MAC+EC header increased by the length of the sensitive data contained in the payload which is the LL-SDU. The length of the sensitive part is determined by the transmitter from the parameter SDL-3 provided by layer 3.

If no sensitive data are contained in the LL-SDU, SDL-2 is equal to the length of the MAC+EC header.

Advantageously, at step 202, redundant data are added to the unprotected payload part in order to improve error robustness. These data are added by implementing a FEC scheme.

At step 204, a CRC is calculated only for the sensitive part of the LLPDU. This sensitive part is the MAC+EC header and the sensitive part of the LL-SDU.

Then, the LL-PDU and the CRC are concatenated and transmitted, at step 206.

When receiving a packet, the receiver calculates the checksum for the sensitive part of the received LL-PDU, at step 208. For calculating the checksum, the receiver uses the receiver SDL contained in the MAC+EC header. Then, the receiver compares the checksum to the received CRC, at step 210.

The received LL-PDU is considered as correct if the checksum calculated only on the sensitive part of the LL-PDU is equal to the CRC. Otherwise, the packet is considered as corrupted.

In this mode, the receiver is not able to detect all the errors on the payload part and may possibly deliver to upper layer corrupted L3-SDUs. However, the possible errors will be located in the non-sensitive part defined by SDL-3.

If the checksum is equal to the CRC, the LL-PDU is considered as being correctly received and a "correct (OK) acknowledgement" is returned to the emitter, at step 212.

If the checksum does not correspond to the CRC, the LL-PDU is considered as corrupted and a "not correct (NOK) acknowledgement" is returned to the emitter, at step 214.

At step 216, a test is performed to decide whether the next LL-SDU transmission has to be made with the same mode or with the other mode.

If the transmission mode has not to be switched, steps, 206 and 208 are repeated. Otherwise, step 100 and followings are implemented.

When the transmitted LL-PDU is considered as correct, the following LL-SDU is considered in the LL-SDU queue, at step 218.

It is then checked, at step 220, if the EC-PartARQ mode can still be used or if the mode has to be changed. The same criteria as at step 216 are applied.

The receiver performs the mode switching between EC-ARQ and EC-PartARQ by analysing the SDL field that is filled by the transmitter for each transmitted packet in both modes. When SDL indicates that the entire packet is protected by the CRC, then the current mode is EC-ARQ. Otherwise, the current mode chosen by the transmitter for the received packet is EC-PartARQ.

The transitions between EC-ARQ and EC-PartARQ modes are decided by the transmitter and they may be triggered by different kinds of events and criteria. These criteria are summarised on FIG. 4.

A single or a combination of the following statements may be chosen according to the system and the available information 1. Age of LL-SDU At layer 2, some packets can be discarded because there are too old for the application. Before a transmission, the maximum delay $D_M$ acceptable for the application is indicated at the opening of the service. Therefore, the age of the LL-SDU is a good parameter for triggering a change of state.

In the transmitter, every LL-SDU is time-stamped at the system's input, which allows calculating the age $A_i(t)$ of each LL-SDU i at every instant t from initial timestamp value. In this implementation, the application layer 3 communicates its maximum allowed delay $D_M$ to the link layer.

From $D_M$ and other parameters provided by upper layers such as the data rate, two delay thresholds are fixed by the link layer at the opening of the service: $D_{PartARQ}$ and $D_{ARQ}$ with $D_{ARQ} < D_{PartARQ} < D_M$.

The transition from EC-ARQ to EC-PartARQ occurs when the age of the oldest LL-SDU in the input LL-SDU queue has exceeded the $D_{PartARQ}$ threshold. The transition from the EC-PartARQ to the EC-ARQ state occurs when the age of the oldest LL-SDU becomes lower than $D_{ARQ}$.

$D_{PartARQ}$ and $D_{ARQ}$ are chosen in order to minimise the number of packet discarding. Indeed, even in EC-PartARQ mode, a LL-PDU may be repeated if an error occurs in its sensitive part. The probability of such an error is lower than in EC-ARQ mode but is not null. Therefore, the age of the LL-SDU can carry on increasing even in EC-PartARQ mode, which explains why the margin between the $D_{PartARQ}$ and the maximum allowed delay $D_M$ shall be chosen carefully.

2. Input LL-SDU Queue

In real system, the input LL-SDU queue has a limited size and some packets can be discarded if this queue overflows. The number of LL-SDUs in the queue at instant t is denoted n(t).

The transition from EC-ARQ to EC-PartARQ mode occurs when n(t) has exceeded a given threshold $N_{PartARQ}$. The transition from EC-PartARQ to EC-ARQ mode occurs when n(t) has dropped under a given threshold $N_{ARQ}$ with $N_{ARQ} < N_{PartARQ}$.

3. Number of Multiple Repetitions of LL-SDU

Some systems may limit the number of repetitions $r_i(t)$ of an identical LL-SDU i at time t.

In that case, the transition from EC-ARQ to EC-PartARQ mode is triggered when one LL-SDU has been repeated more than a maximum allowed number of repetitions $R_{PartARQ}$.

4. Packet Error Rate (PER) Measurement

As for other criterion, two thresholds $PER_{PartARQ}$ and $PER_{ARQ}$ with $PER_{ARQ} < PER_{PartARQ}$ are then defined and are used to switch respectively to EC-PartARQ and EC-ARQ states when the instant average PER per(t) exceeds $PER_{PartARQ}$ or drops under $PER_{ARQ}$. Indeed, it is known that the ARQ mechanisms work correctly up to a given PER. Beyond this operating point, ARQ is not adapted and ARQ transmitter blocking will occur. Therefore, the instant average PER per(t) might be a good preventive criterion to switch between both states.

Figure 4:
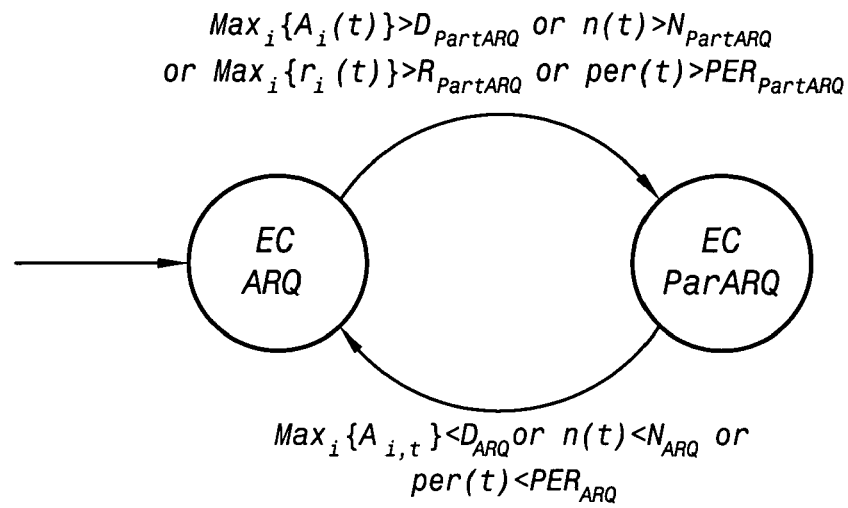
FIG. 4 is a schematical view of the state machine in the transmitter
Figure 6:
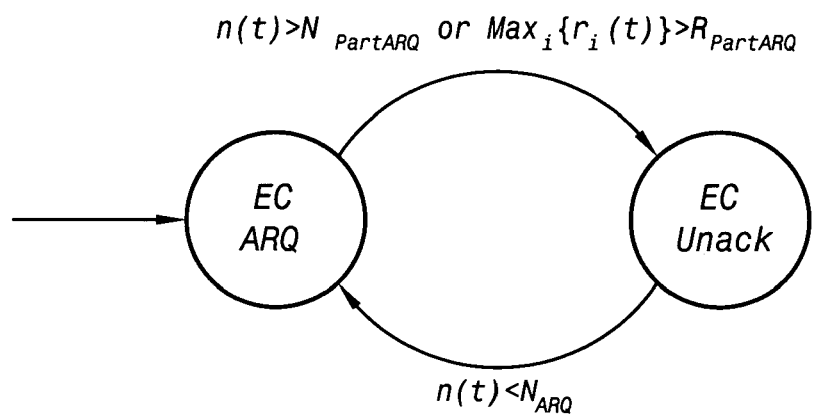
FIG. 6 is a schematical view of the state machine in a 802.11 transmitter.

The state machine shown in FIG. 4 summarises the different criteria that may be applied to switch between EC-ARQ and EC-PartARQ in the transmitter. The starting state is EC-ARQ.

Such a mechanism might be applied to the IEEE 802.11 standard as explained below.

IEEE 802.11 is a wireless LAN standard that defines a set of specifications for the physical and link layers. It supports various physical layers based on different technologies. The most popular are:

- 802.11a: OFDM at 5 GHz with a maximum throughput of 54 Mb/s.
- 802.11b: CCK for DSSS at 2.4 GHz with a maximum throughput of 11 Mb/s.
- 802.11g: OFDM at 2.4 GHz with a maximum throughput of 54 Mb/s.

In legacy 802.11, a common and unique link layer has been defined that is based on Carrier Sense Multiple Access/Collision Avoidance (CSMA/CA) mechanism (contention access) and a "stop and go" ARQ. In such a scheme, the transmitter sent a frame after having waited for a back-off period and listened for the medium. Then, it waits for an acknowledgement frame during a given time interval. Acknowledgement is generated by the receiver if the frame has been received without any errors. If the transmitter does not receive the acknowledgement (the frame was either lost or bad received, or the acknowledgement was damaged), the frame is retransmitted immediately. To avoid dead locks, the standard limits the number of repetition of a same frame.

Figure 5:
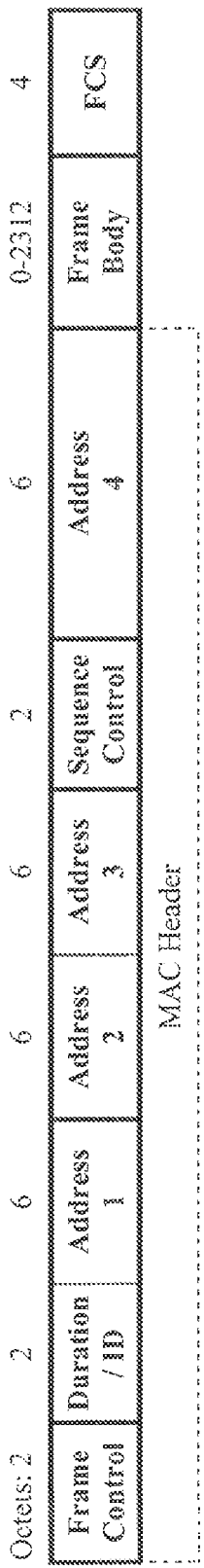
FIG. 5 is a view of a IEEE 802.11 MAC frame format.

FIG. 5 gives the general format of the IEEE 802.11 MAC frame.

The Frame Control field includes the frame data type that allows identifying the function of the frame.

Address 1 contains the address of the source device while address 2 contains the address of the destination device. The sequence control field indicates the sequence number of the transmitted frame. Frame body is a variable length field that contains the payload. The FCS field contains a 32-bit CRC calculated over all the fields of the MAC header and Frame Body.

The length of the frame is given by the PHY layer on reception and it does not take part of the MAC frame structure.

It must be noted that the legacy 802.11 MAC does not provide segmentation: the L3-PDUs received from layer 3 are directly encapsulated into the frame, i.e. in the Frame Body field.

In order to apply the proposed mechanism, the MAC frame shall be extended and a partial checksum is introduced. A CRC Coverage field (CC) is added to the MAC header that indicates how many bytes, starting from the beginning of the frame, are sensitive and are covered by the checksum (i.e. the FCS field). This CC field is the 802.11 application of the SDL field presented in the previous section.

On reception of this type of frame, the receiver verifies the checksum on the number of bytes indicated in the CC field. The behaviour of the receiver remains identical to legacy 802.11: if no error occurs on the protected data area, the receiver emits an acknowledgement frame.

In EC-ARQ mode, the CRC goes on covering the entire frame like in legacy 802.11. Therefore, the CC field contains the length of the MAC frame (minus the length of the FCS field).

In EC-PartARQ mode, the CRC only covers the MAC+EC header and a part of the payload. This part can have a variable length and contains sensitive information of upper protocol. For instance, if the application data are transported over the IP protocol and UDP Lite, this part includes the IP and the UDP header. In this mode, the CC field is at least greater than the size of the MAC+EC header.

A specific data type is defined for this extended frame and is indicated in the Frame Control field.

As explained before, the transmitter determines the running EC mode. The criteria for EC mode switching is determined in order to minimise the number of cases where some packets are discarded by the system. According to the implementation complexity and the required quality of service, only a set of the presented criteria is chosen. For instance, a simple implementation will keep only some thresholds on the input LL-SDU queue and on the maximum number of retransmission as shown in FIG. 5.

$n(t)$ is the number of LL-SDUs stored in the input LL-SDU FIFO. This is the number of frames that are waiting for emission.

$N_{PartARQ}$ is the queue threshold (a number of LL-SDU) that triggers a transition from EC-ARQ to EC-PartARQ state.

$N_{ARQ}$ is the queue threshold that triggers a transition from EC-PartARQ to EC-ARQ state.

$r_i(t)$ is the number of repetitions of the current frame.

$R_{PartARQ}$ is the maximum number of repetitions of a frame. It may be chosen as equal to the value fixed by the standard minus one.

Figure 7:
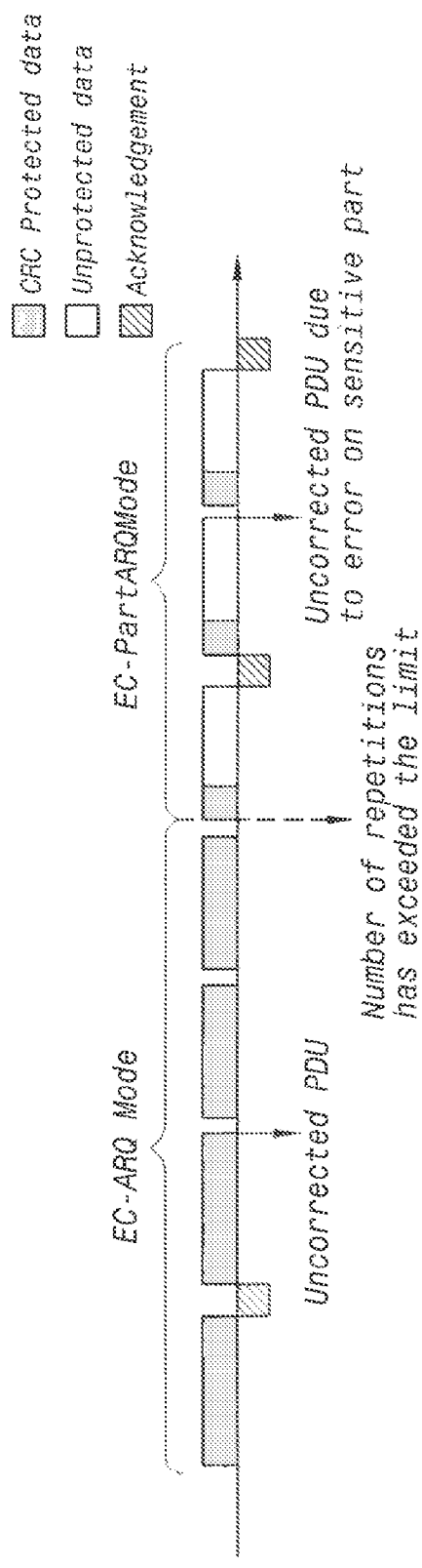
FIG. 7 is a schematical view of a IEEE 802.11 sequence sample when the invention is implemented.

FIG. 7 shows an example of a possible transmission sequence. At the beginning, the EC-Mode is EC-ARQ and each transmitted frame is entirely protected. After 3 repetitions of the same frame, the transmitter decides to switch to EC-PartARQ mode because the maximum number of repetition has been reached. The frame is then retransmitted as previously but without protecting a part of the payload. As the error probability decreases, the frame is considered as well received. Another one is then transmitted in EC-PartARQ mode. As an error occurs on the sensitive part of the frame, it is repeated at the end of the presented sequence.

With the invention, when congestion occurs, the system tries to limit the number of repetitions by protecting only sensitive data. By this way, the error probability on the transmitted frame decreases since the protected sensitive part of the frame is smaller. This system is profitable if the number of protected bytes is small compared to the frame size. Therefore, it is interesting for high bit rate applications that generate long packets.

It can be completed by a standard discard mechanism and will be used in that case as a preventive mean to reduce the bad effects of possible congestion.

The description of the process is based on a "stop and go" ARQ scheme. Nevertheless, the invention can be implemented with other ARQ scheme like, for example, Go Back N ARQ or selective Repeat ARQ.

The invention claimed is:

1. A method for transmitting a payload encapsulated in a packet from a transmitter to a receiver by using an Automatic Request process, comprising:

checking each packet received from the transmitter to detect any potential corrupted received packets;

acknowledging the correct or the corrupted reception of said each received packet by emitting one or many acknowledgment messages to the transmitter;

resending the packets that were indicated as corrupted in the acknowledgment messages sent by the receiver using an EC-Part-ARQ error control mechanism;

changing modes and implementing an EC-ARQ error control mechanism, said EC-ARQ error control mechanism including the steps of, checking all of the data in each received packet to detect any potential corrupted received packet, a packet being considered as corrupted when the entire set of data of the packet has not been correctly received, and periodically setting the error control mechanism which has to be selected among the EC-ARQ error control mechanism and the EC-Part-ARQ error control mechanism;

wherein the resending includes, for at least some of the packets indicated as corrupted, implementing the EC-part-ARQ error control mechanism including the steps of, defining a sensitive part and a non-sensitive part in the packets indicated as corrupted on a packet by packet basis, the length of each of the sensitive part and the non-sensitive part being variable, the sensitive part not being confined to the header, before resending the packets indicated as corrupted, enclosing information defining the sensitive part in a specific field that is located in the respective sensitive parts of the packets, and checking only the respective sensitive parts in the resent packets to detect any potential corrupted received packet, a packet being considered as corrupted when the sensitive part has not been correctly received.

2. The method according to claim 1 further comprising:

setting, to change the error control mechanism selected, the length of the sensitive part either to the total length of the packet to be transmitted when the EC-ARQ error control mechanism is selected or to a partial length of the packet to be transmitted when the EC-Part-ARQ error control mechanism is selected.

3. The method according to claim 1, wherein the error control mechanism selected depends on an age of the payload to be transmitted, the age of the payload being the duration between the time when the payload has been provided ready for sending and the time the payload is actually sent to the receiver.

4. The method according to claim 1, wherein the error control mechanism selected depends on the number of payloads which are waiting to be sent.

5. The method according to claim 1, wherein the error control mechanism selected depends on the number of repetitions of the current packet.

6. The method according to claim 1, wherein the error control mechanism selected depends on the packet error rate measurement of the transmission.

7. A transmission system configured to implement an Automatic Request process, comprising:
   a transmitter; and
   a receiver configured to check each packet received from the transmitter to detect any potential corrupted received packets, the receiver configured to acknowledge the correct or the corrupted reception of said each received packet by emitting one or many acknowledgment messages to the transmitter; wherein
   the transmitter is configured to resend the packets that were indicated as corrupted in the acknowledgment messages sent by the receiver,
   for at least some of the resent packets, the transmitter is configured to implement an EC-part-ARQ error control mechanism by,
      defining a sensitive part and a non-sensitive part in the packets indicated as corrupted on a packet by packet basis, the length of each of the sensitive part and the non-sensitive part being variable, the sensitive part not being confined to the header,
      before resending the packets indicated as corrupted, enclosing information defining the sensitive part in a specific field that is located in the respective sensitive parts of the packets, and
   checking only the respective sensitive parts in the resent packets to detect any potential corrupted received packet, a packet being considered as corrupted when the sensitive part has not been correctly received,
   wherein the transmitter changes modes and implements an EC-ARQ error control mechanism, said EC-ARQ error control mechanism (i) checks all of the data in each received packet to detect any potential corrupted received packet, a packet being considered as corrupted when the entire set of data of the packet has not been correctly received and (ii) periodically sets the error control mechanism which has to be selected among the EC-ARQ error control mechanism and the EC-Part-ARQ error control mechanism.

* * * * *